United States Patent [19]

Swenson et al.

[11] Patent Number: 5,558,273
[45] Date of Patent: Sep. 24, 1996

[54] TWO-PIPE SYSTEM FOR REFRIGERANT ISOLATION

[75] Inventors: Paul F. Swenson, Shaker Hts., Ohio; Edwin E. Jordan, Parkersburg, W. Va.; Joseph Gerstmann, Framingham, Mass.

[73] Assignee: Advanced Mechanical Technology, Inc., Watertown, Mass.

[21] Appl. No.: 336,985

[22] Filed: Nov. 10, 1994

[51] Int. Cl.$^6$ .................................................. F25B 27/00
[52] U.S. Cl. .................. 237/2 B; 62/238.7; 165/104.19; 165/DIG. 353
[58] Field of Search .................... 237/2 B; 62/238.6, 62/238.7, 323.1; 165/104.19, DIG. 353

[56] References Cited

U.S. PATENT DOCUMENTS

| | | | |
|---|---|---|---|
| 1,969,187 | 8/1934 | Schutt | 165/104.19 |
| 2,282,878 | 5/1942 | Newton | 62/323.1 X |
| 2,721,061 | 10/1955 | Freer | 165/DIG. 353 |
| 4,350,024 | 9/1982 | Moll | 62/238.6 |
| 4,575,001 | 3/1986 | Oskarsson et al. | 237/2 B |
| 4,735,061 | 4/1988 | Hsieh | 62/323.1 X |
| 4,976,464 | 12/1990 | Swenson | 237/81 |
| 5,052,187 | 10/1991 | Robinson, Jr. | 237/2 B X |
| 5,192,022 | 3/1993 | Swenson | 237/2 B |
| 5,226,594 | 7/1993 | Swenson | 237/2 B |
| 5,243,825 | 9/1993 | Lin | 62/323.1 X |
| 5,253,805 | 10/1993 | Swenson | 237/2 B |

*Primary Examiner*—William E. Tapolcai
*Attorney, Agent, or Firm*—Pearne, Gordon, McCoy & Granger

[57] ABSTRACT

A heat pump system for heating and cooling including a vapor compressor driven by a heat engine in which the refrigerant is isolated from a space being conditioned, by a two-pipe loop that, in a heating mode transfers both refrigeration derived heat and heat rejected by the heat engine in an efficient serial manner. The system circuitry includes a counterflow heat transfer fluid to air heat exchanger and a heat transfer fluid to potable water heater exchanger.

11 Claims, 2 Drawing Sheets

Fig.2

| MODE # | VALVE POSITIONS | | | | | | | | | OPERATING MODE DESCRIPTION |
|---|---|---|---|---|---|---|---|---|---|---|
| | A | B | C | D | E | F | G | H | I | |
| 1 | ⊖ | ⊕ | ⊕ | ⊕ | ⊖ | ⊕ | ○ | ⊕ | ⊕ | REAL TIME SPACE HEATING |
| 2 | ⊖ | ⊕ | ⊕ | ⊕ | ⊕ | ⊕ | ⊖ | ⊕ | ⊕ | LOW LOAD HEATING AND HEAT STORE |
| 3* | ○ | ○ | ○ | ⊕ | ⊕ | ⊕ | ⊕ | ⊕ | ○ | ANY LOAD HEATING, ENGINE OFF |
| 4 | ⊕ | ⊕ | ⊕ | ⊕ | ○ | ⊕ | ⊕ | ⊕ | ⊕ | HEAT STORE ONLY |
| 5 | ⊖ | ⊕ | ⊕ | ⊕ | ⊕ | ⊖ | ⊖ | ⊕ | ⊕ | HEATING WITH SUPPL. HEAT |
| 6 | ⊖ | ⊕ | ⊕ | ⊕ | ⊕ | ⊕ | ○ | ⊕ | ⊕ | REAL TIME SPACE COOLING |

*⎧ ALTERNATE CYCLE ON LOW LOAD
 ⎩ BACK-UP HEAT ON ENGINE FAILURE

TWO-PIPE SYSTEM FOR REFRIGERANT ISOLATION

BACKGROUND OF THE INVENTION

The invention relates to improvements in heat pump systems and, in particular, to a fuel-fired heat pump system coupled to a load including an air handler and a heat storage medium by an isolation circuit.

PRIOR ART

U.S. Pat. Nos. 4,976,464, 5,192,022, 5,226,594 and 5,253,805 assigned to the assignee of the present invention, disclose methods and apparatus that utilize a heat engine to drive the refrigeration compressor of a heat pump circuit for space conditioning. Such circuits are typically interconnected to a heat storage medium in the form of a tank-type water heater that can be heated both from the heat pump unit and from a fuel burner associated with the tank.

These space conditioning systems can improve operating efficiency by reducing cycling losses and by utilizing heat rejected from the engine. Additionally, the systems can provide a back-up heat source in the event of an engine malfunction. The aforementioned U.S. Pat. No. 5,253,805 teaches a technique to isolate the refrigerant from the space being conditioned.

SUMMARY OF THE INVENTION

The invention provides a fuel-fired heat pump system for conditioning the air of an enclosed space that has its heat engine and refrigeration circuit outdoors and is thermally coupled to the indoor load in a simplified manner. The indoor load is represented as a heat exchanger for heating or cooling the air in the enclosed space and a heat exchanger for heating water stored in a potable hot water tank. In the preferred embodiment the heat exchange between the heat pump and, in heating service, the heat engine with the load is accomplished with a heat transfer fluid circulated through a closed loop circuit that advantageously isolates the refrigerant from the interior of the space. The circuit requires only two pipes between the heat exchangers for the heat pump and heat engine and the load.

The disclosed simplified two-pipe system is capable of efficient operation by virtue of a unique arrangement of the associated heat exchangers. In particular, for heating service, at the outdoor section, the circuit directs heat transfer fluid first through the heat pump heat exchanger and then through the heat engine heat exchanger. Indoors, the circuit conducts the heat transfer fluid in counterflow relation to forced air flow in an associated duct. Where the hot water storage tank requires heat, the circuit delivers heat transfer fluid first to the water tank heat exchanger and then to the air heat exchanger.

The disclosed simplified two-pipe system can reduce original equipment cost as well as installation cost while still achieving high operating efficiency and reliability. Advantageously, the hot water storage tank is a fuel-fired heater type for potable hot water. A novel aspect of the invention involves a heat exchanger construction integrated with such a tank in a cost effective manner that avoids the risk of contamination of the potable water.

BRIEF DESCRIPTION OF THE DRAWINGS

FIG. 1a is a fragmentary sectional view of the wall of a hot water storage tank and associated heat exchanger coils; and FIG. 2 is a chart illustrating specific valve positions for a series of operating modes.

DESCRIPTION OF THE PREFERRED EMBODIMENT

Figure 1:
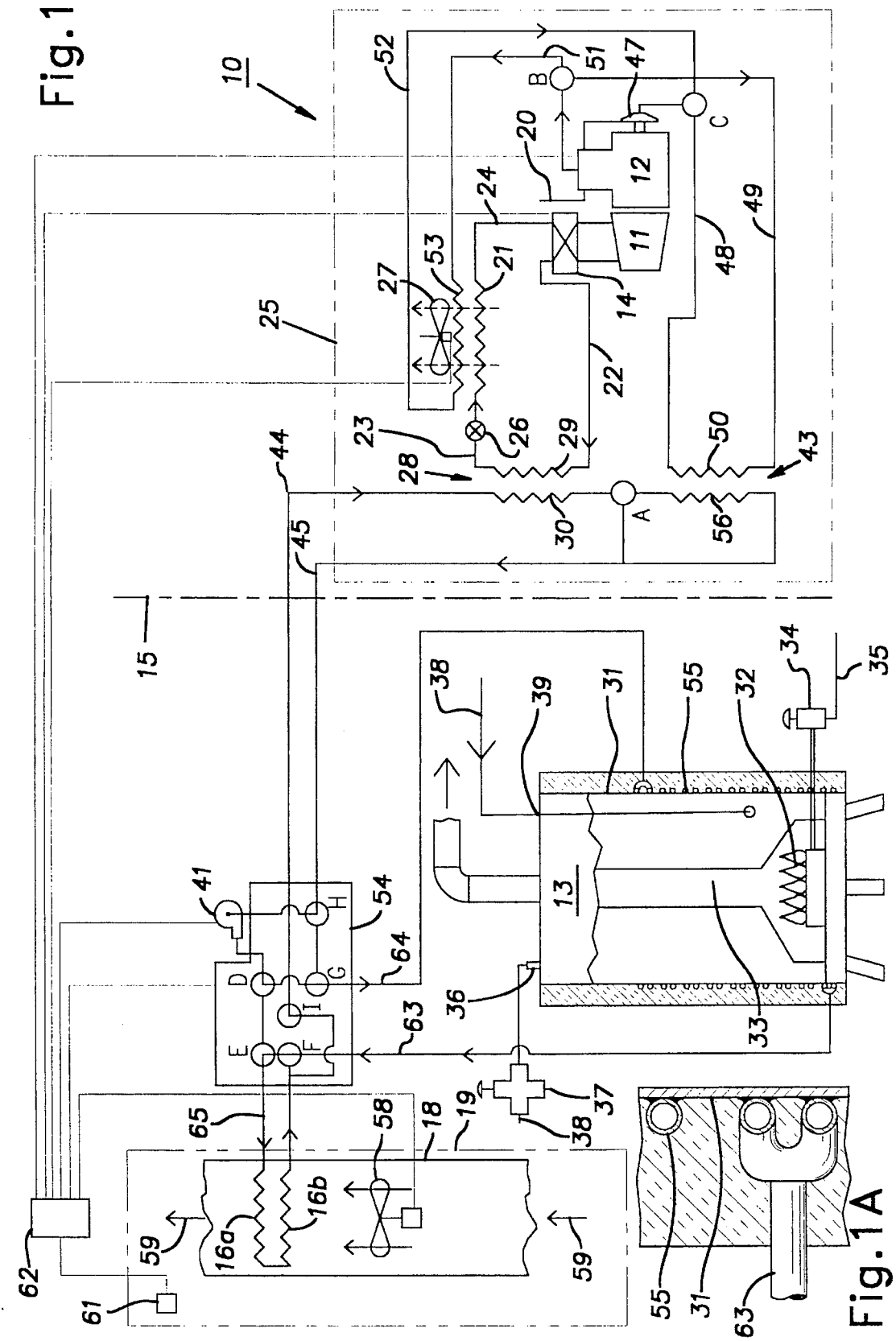
FIG. 1 is a schematic diagram of a space conditioning and hot water storage system employing the present invention shown in Mode 2, providing low load heating and heat storage.

FIG. 1 illustrates a system 10 for air conditioning, i.e. space heating and cooling a residential, work or recreational area such as a house, apartment, office or like occupied space. The system 10 includes a heat pump compressor 11 driven by a fuel-fired prime mover or engine 12 and a storage-type hot water heater 13. The system 10 further includes heat exchanger coils 16a, b in a duct 18 through which air from the space being conditioned is circulated. The closed space being conditioned by the system 10 is schematically illustrated by the broken line 19. A building represented by the zone to the left of a broken line 15 in FIG. 1 containing the conditioned space 19 may also contain other enclosed areas either occupied or normally non-occupied areas such as a boiler room or other equipment room.

The prime mover 12 is an internal combustion engine or other heat engine such as a Sterling, steam or gas driven unit and is preferably fueled by natural gas or other combustible fuel supplied by a line 20. The illustrated heat pump compressor 11 is preferably a refrigerant vapor compressor producing a reverse Rankine vapor compression cycle. It will be understood that various types of compressors such as reciprocating, screw, vane, or centrifugal can be used. Further, a reverse Brayton heat pump cycle can also be used. Typically, the engine 12 and compressor 11 are situated outdoors of the building 15 and are contained in a common cabinet 25. Ordinarily, the mechanical power output capacity of the engine 12 is matched to the rated power requirement of the heat pump compressor 11.

Operation of the system 10 is described herein first with reference to heating service and later with reference to cooling service. In heating service, a refrigerant fluid, when the heat pump compressor 11 is operating and a four-way cross over valve 14 is appropriately positioned by a controller 62, circulates through a heat exchanger 28 located outdoors in or adjacent the cabinet 25 and through another coil or heat exchanger 21 also located outdoors in or adjacent the cabinet through interconnecting lines 22–24. Heat is absorbed by the refrigerant fluid at the outdoor heat exchanger 21 and is exchanged from this fluid to a heat transfer fluid, typically a liquid, at the heat exchanger 28 as more fully discussed below. A refrigerant liquid expansion valve 26 in the line 23 causes the refrigerant to enter the outdoor heat exchanger coil 21 partially vaporized at low pressure and low temperature. The outdoor coil 21 is in heat exchange relation to outdoor or environmental air which may be circulated across the coil by a powered fan 27. Alternatively, the outdoor coil 21 may be in heat exchange relation with a subsurface media such as ground water or with a solar pond. Heat absorbed by the refrigerant as it passes through the coil 21 causes it to be vaporized. The compressor 11 elevates the pressure of the vaporized refrigerant and, therefore, the condensing temperature of the refrigerant fluid before it enters the heat exchanger 28. The refrigerant condenses in the heat exchanger 28 giving up heat.

The heat exchanger 28 has a coil 29 through which the refrigerant circulates and a coil 30 through which a heat transfer fluid circulates. The coils 29, 30 are in thermal communication with each other. The heat transfer fluid in the coil 30 is preferably a liquid such as a water and ethylene glycol solution or another liquid capable of absorbing and transferring heat and not freezing in normally expected winter air temperatures at the site of the building. The coils 29, 30 allow heat to be transferred from the fluid contained in one coil to the fluid contained in the other coil while maintaining the fluids physically isolated from one another.

A heat exchanger 43, conveniently a liquid-to-liquid type, is arranged, selectively through a valve "A", to transfer heat rejected by the engine 12 to the heat transfer fluid circulated in the heat exchanger coil 30 associated with the refrigeration circuit and related supply and return lines 44, 45 respectively. A pump 47 mechanically driven by the engine 12 circulates engine coolant through lines 48, 49 connecting it with a coil 50 of the heat exchanger 43 and through lines 51, 52 connecting it with a liquid-to-air heat exchanger 53 served by the fan 27. The engine coolant circulating in these lines typically is arranged to absorb heat being rejected by the engine in its jacket and, if desired, in its exhaust. Rejected heat from the engine 12 is available at a higher temperature than the temperature reached by the heat pump refrigerant. This relationship is accounted for by arranging a coil 56 of the engine coolant heat exchanger 43 downstream, with reference to flow of the heat transfer fluid in the lines 44, 45 of the coil 29, of the refrigerant heat exchanger 28, when the coil 56 is active.

During heating service, heat transfer fluid circulated by a pump 41, operated by the controller 62, through supply and return lines 44, 45 first picks up heat from the refrigerant coupled coil 30 and then from the engine coolant or rejected heat coil 56. From the latter coil 56, the heat transfer fluid is conducted through the line 45 to a valve housing 54 from which it is directed to the air duct coils 16a, b or, a heat exchanger 55 associated with the hot water tank 13 or, serially to both the hot water tank exchanger 55 and the duct heat exchangers 16a, b. It will be understood that the controller 62 has control lines to the various directional control valves A, B and C in the cabinet 25 as well as individual valve components D through H in the housing 54.

The refrigerant coupled coil 30, engine heat coupled coil 56 and the supply and return lines 44 and 45 form an isolation circuit that transfers heat from the heat pump circuitry and from the engine 12 indoors to the tank 13 and/or the air duct coils 16a, b in the building while maintaining refrigerant out of the building.

Relatively high temperature heat storage is preferably provided by the unit 13 in the form of a storage-type hot water heater. Particularly suited for this application are appliances which comply to American National Standards Institute Standard Z-21.10. The heater 13 is of generally conventional construction with the exception of the addition of the heat exchanger 55 provided as a coil wrapped on the exterior of a tank proper 31 as described in greater detail below.

The tank 31 has a capacity in the range of 30 to 50 gallons, for example, and a burner 32 with a capacity in the range of 36,000 to 100,000 btu/hr., for example, centrally located at its bottom. The burner 32 mixes natural gas from a supply line 35 and air and supports combustion of the same. Combustion products from the burner 32 pass through a vertical stack 33 through the center of the tank 31 to heat water stored therein in a known manner.

A conventional thermostatic control valve 34 responds to the temperature of water in the tank 31 and operates the burner 32 whenever the temperature falls below a predetermined limit, for example, 120° F. An outlet 36 on the heater tank 31 supplies potable hot water through a line 37 to sink taps and the like at the space 19. A source of cold potable water, such as a public utility line, supplies an inlet 39 of the tank 31 through a line 38 to make up for water use at the taps.

The heat exchanger coil 55 is preferably comprised of metal tubing wrapped about the exterior of the heater tank 31. Ordinarily, the tank is a cylindrical structure formed of steel and the tube forming the coil 55 can be wrapped in direct contact with the tank and held in place by solder or other suitable thermally conductive material such as an adhesive. The tube can be made of copper, steel or other suitable metal. In one example, with a 50 gallon tank adequate heat transfer was achieved using a ½" diameter copper tube coiled in a double helix about the lower ⅔ portion of the tank. The coil was soldered along essentially its full length to the exterior of the tank with adjacent turns on a 1-½" spacing. The external construction of the heat exchanger coil 55 on the outside surface of the tank 31 eliminates the risk that the heat exchange fluid carried therein can enter the tank in the event of a leak and contaminate the potable water contained in the tank. The heat exchanger 55 is coupled to the valve housing 54 by lines 63, 64.

A blower 58 circulates air from the space 19 being conditioned through the duct 18 in the direction indicated by the arrows 59 in order to heat this air at the exchangers 16a, b. The blower 58 is operated under the command of the controller 62. A thermostat 61 monitors the temperature of air within the space 19 and provides a signal to the controller 62. The controller 62, in response to a signal from the thermostat 61 that there is a demand for heat, causes the engine 12 to start-up and drive the heat pump compressor 11 thereby moving heat from the outdoor coil 21 to the other heat pump coil 29. At the same time, rejected engine heat is delivered to the coil 50 of the associated heat exchanger 43.

The valve housing 54 is conveniently situated indoors and can be integrated with the pump 41 if desired. The controller 62 selectively operates individual valves D, E, F, G and H in the housing 54 and valves A, B, C in the outdoor cabinet 25.

The chart of FIG. 2 pictorializes the position of the valves A–H for various operating modes of the space conditioning system 10. In all of the heating modes, the pump 41 and relevant valves are operational to circulate heat transfer fluid through the loop formed by the lines 44 and 45 and the heat exchanger coils 30 and 56 with such fluid serially passing first through the refrigerant coupled coil 30 and then through the engine heat coil 56. In Mode 1, heat from the heat pump system is used exclusively for heating the air of the space 19. The line 45 returns the heat transfer fluid to the valve housing 54 from which it is directed through a line 65 to the air duct heat exchange coils 16a, b. Fluid flow in the coils 16a, b is in counter-flow relation to forced air flow in the duct 18 for maximum heat transfer efficiency.

In Mode 2, the system 10 operates to provide space heating of air at low or moderate levels and to store the balance of heat being developed by the heat pump and its engine in the hot water storage tank 13. In this operational mode, the valves E–H direct hot heat transfer fluid returning from the heat exchangers 30 and 56 serially first through the heat exchanger coil 55 associated with the hot water storage tank 13 and then through the air duct heat exchangers 16a, b.

In Mode 3, the engine 12 and heat pump compressor 11 are not operated and heat is provided solely from that existing in the tank 13. This is accomplished by operating the pump 41 to circulate heat transfer fluid through the hot water coil 55 and then serially through the heat exchangers 16a, b. It will be understood that in Mode 3 heat in the tank 13 can be used to heat the space 19 at appropriate times between periods of operation of the engine 12 and the heat pump compressor 11. In a simple effective control strategy. The controller 62 for successive periods of heat demand can alternate modes of heat supply between operation of the heat pump (Modes 1 or 2) and exchange of heat from water in the tank 13 without heat pump operation in this Mode 3.

In Mode 4, the heat pump system 10 operates to store heat, i.e. to heat potable water only and does not provide space heating. As can be seen in the chart of FIG. 2, valves isolate the circulating heat transfer fluid from the air duct coils 16a, b and limit its circulation for heat delivery to the hot water tank heat exchanger coil 55. Modes 5 and 6 in the chart of FIG. 2 represent alternative constructions of the valves F and H, respectively. In these modes, heat is supplied for space air heating simultaneously from the heat pump system as well as the burner of the hot water tank 13.

Operation of the system 10 for cooling the space 19 is represented by Mode 6 in the table of FIG. 2. In this mode, the controller 62 shifts the valve 14 to reverse the flow of refrigerant fluid through the lines 22–24 and initiates operation of the engine 12 and compressor 11. When the compressor 11 operates in this mode, heat is absorbed by refrigerant in its coil 29 from the heat transfer fluid in the coil 30 and this heat is discharged to the atmosphere from the refrigerant coil 21. The valves B and C direct engine coolant carrying heat rejected by the engine through line 51 to the heat exchanger 53 to discharge such heat to the environmental air. The engine coolant returns through line 52. The valve A assumes a position that shunts heat transfer fluid leaving the coil 30 in a chilled condition away from the engine heat coil 56 (which is inactive) and conducts it directly to the line 45. The valves in the housing 54 direct this chilled heat transfer fluid to the coils 16a, b for cooling air flowing to the duct 18.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

We claim:

1. A space conditioning system for a building comprising a refrigeration circuit external of the building, the refrigeration circuit including a refrigerant vapor compressor, a heat engine for driving the compressor, a pair of refrigerant heat exchangers for evaporating and condensing the refrigerant, one of said refrigerant heat exchangers being arranged to transfer heat with the environment external of the building, a heat storage unit, a heat transfer circuit for transferring heat between the interior and exterior of the building, the heat transfer circuit including a first heat exchanger in thermal communication with the other refrigerant heat exchanger, a second heat exchanger for absorbing rejected heat from the heat engine, and a third heat exchanger for thermal communication with air in an interior space of the building, the heat transfer circuit including lines for conducting heat transfer fluid between its associated heat exchangers and said heat storage unit for heat transfer therebetween, and means for circulating heat transfer fluid in said lines, said fluid circulating means being operable independently of said refrigerant compressor to circulate heat transfer in said lines between said heat transfer circuit heat exchangers and said heat storage unit, said heat transfer circuit being selectively operable to circulate heat transfer fluid serially through its first heat exchanger and then through its second heat exchanger and then through its third heat exchanger in a heating mode.

2. A space conditioning system as set forth in claim 1, including a duct and a blower for circulating building air in a direction through said duct, said third heat exchanger being arranged to present heat transfer fluid in counterflow relation to the direction of air flow in said duct.

3. A space conditioning system as set forth in claim 1, wherein said heat transfer circuit is selectively operable to conduct said heat transfer fluid serially from its second heat exchanger to said heat storage unit and then to said third heat exchanger.

4. A space conditioning system as set forth in claim 1, wherein said heat storage unit is a potable hot water heater tank, said heat transfer circuit including a fourth heat exchanger in thermal communication with water stored in said tank.

5. A space conditioning system as set forth in claim 4, wherein said heat transfer circuit is selectively operable to circulate heat transfer fluid between said fourth heat exchanger and said third heat exchanger while bypassing said first and second heat exchangers whereby air in the building can be heated from heat stored in the hot water heater tank.

6. A space conditioning system as set forth in claim 5, wherein said hot water heater tank is a cylindrical unit and said fourth heat exchanger comprises a tube wrapped about and in direct thermal communication with the exterior of said tank.

7. A heat pump system for a building comprising a fuel-fired prime mover adapted to be disposed outside of the building, a refrigerant compressor, a pair of heat exchangers associated with the refrigerant compressor, one of said heat exchangers exchanging heat with the environment and the other exchanging heat to the building interior, a tank-type water heater, an indoor heat exchanger, a heat transfer fluid circuit for conducting heat from one of the refrigerant heat exchangers to the tank of the water heater and the indoor heat exchanger, means for circulating fluid through the circuit and valve means for controlling the path of fluid through the fluid circuit, said valve means and fluid circuit being constructed and arranged to direct heat exchange fluid first through the other refrigeration heat exchanger and then through the engine rejected heat heat exchanger and then either to the water tank heat exchanger or the indoor heat exchanger.

8. A heat pump system as set forth in claim 7, wherein the circuit and indoor heat exchanger are arranged in counterflow relation with the flow of indoor air in a forced air duct.

9. A heat pump system as set forth in claim 7, wherein said circuit and valve means are arranged to conduct heat transfer fluid first to said heat exchanger for said tank and then to said indoor heat exchanger.

10. A heat pump system for a building comprising a refrigeration circuit having a refrigerant vapor compressor and a refrigerant, a prime mover for driving the compressor, first and second refrigeration heat exchanger means for evaporating and condensing the refrigerant, the first of said refrigerant heat exchangers being arranged to transfer heat with the environment external of the building, a storage-type hot water heater with a cylindrical tank for storing potable water, and a natural gas burner in direct heat exchange relation with the tank, a heat exchanger formed of metal tubing wrapped in a plurality of turns on the exterior of the tank, the tubing being bonded to the tank along substantially its full length with a thermally conductive medium, a circuit for circulating fluid between the other refrigerant heat exchanger and the wrapped tubing water tank heat exchanger for transferring the heat of condensation of said refrigerant to water in the tank, the external relation of the wrapped tubing to the tank avoiding the risk of contaminating potable water in the tank in the event of a leak in either the coil or the wall of the tank.

11. A heat pump system for a building comprising a refrigeration circuit having a refrigerant vapor compressor and a refrigerant, a heat engine for driving the compressor, an engine coolant circuit for receiving heat rejected from the engine, first and second refrigeration heat exchanger means for evaporating and condensing the refrigerant, the first of said refrigerant heat exchangers being arranged to transfer heat with the environment external of the building, a storage-type hot water heater with a cylindrical tank for storing potable water, and a natural gas burner in direct heat exchange relation with the tank, a heat exchanger formed of metal tubing wrapped in a plurality of turns on the exterior of the tank, the tubing being bonded to the tank along substantially its full length with a thermally conductive medium, a circuit for circulating fluid between the other refrigerant heat exchanger, the engine coolant circuit and the wrapped tubing water tank heat exchanger for transferring the heat of condensation of said refrigerant and engine rejected heat to water in the tank, the external relation of the wrapped tubing to the tank avoiding the risk of contaminating potable water in the tank in the event of a leak in either the coil or the wall of the tank.

* * * * *